United States Patent [19]
Ducharme

[11] Patent Number: 5,382,199
[45] Date of Patent: Jan. 17, 1995

[54] LARGE BEARING AREA ROLLER CHAIN

[75] Inventor: Leon N. Ducharme, Holyoke, Mass.

[73] Assignee: U.S. Tsubaki, Inc., Wheeling, Ill.

[21] Appl. No.: 829,234

[22] Filed: Feb. 3, 1992

[51] Int. Cl.$^6$ .................................... F16G 13/10
[52] U.S. Cl. ............................ 474/210; 474/231
[58] Field of Search ............... 474/202, 206, 210, 226, 474/231

[56] References Cited

U.S. PATENT DOCUMENTS

| | | | |
|---|---|---|---|
| 2,056,597 | 10/1936 | Blake | 474/91 |
| 2,168,277 | 8/1939 | Welser et al. | 474/91 |
| 2,185,702 | 1/1940 | Bremer | 474/91 |
| 2,660,898 | 12/1953 | Kew | 474/91 X |
| 4,143,512 | 3/1979 | Templin | 59/85 |
| 4,463,550 | 8/1984 | Avramidis | 59/84 |
| 4,501,351 | 2/1985 | Tracy | 198/648 |
| 4,571,229 | 2/1986 | Burk | 474/231 |
| 4,738,653 | 4/1988 | Riewerts | 474/156 |
| 4,927,002 | 5/1990 | Springman | 198/487.1 |
| 5,176,585 | 1/1993 | Novak | 474/206 |
| 5,176,587 | 1/1993 | Mott | 474/216 |
| 5,192,252 | 3/1993 | Skurka et al. | 474/210 |
| 5,226,856 | 7/1993 | Iacchetta et al. | 474/207 |

*Primary Examiner*—Roger J. Schoeppel
*Attorney, Agent, or Firm*—James Creighton Wray

[57] ABSTRACT

The present invention provides a roller chain for pin oven application, having an increased pin and bushing diameters for larger bearing areas. Decreased bushing and roller thicknesses provide increased bearing areas for prolonging chain life.

20 Claims, 4 Drawing Sheets

FIG. 7a
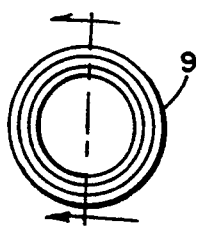
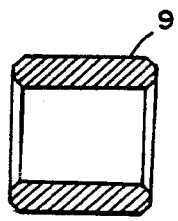
FIG. 7b
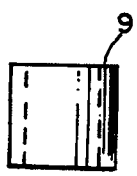
FIG. 8a
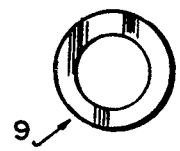
FIG. 8b
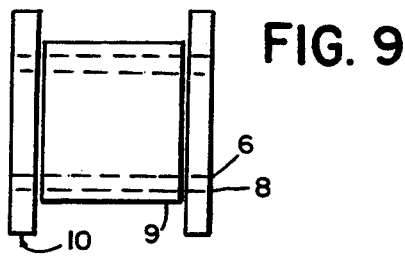
FIG. 9
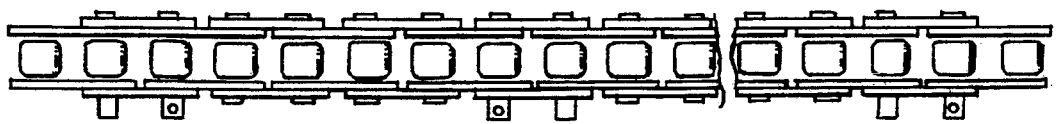
FIG. 12a
FIG. 12b
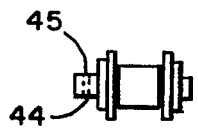
FIG. 12c

LARGE BEARING AREA ROLLER CHAIN

BACKGROUND OF THE INVENTION

Carrier chains used in decorative coating processes are used specifically to carry coated containers through heating and treating ovens where extreme temperatures are encountered. High speed travel is necessary to produce high productivity.

In oven applications, chains display rapid elongation caused by temperature changes and speed of the chain/sprocket engagements, and wear between pins and bushings.

There exists a need for an extended life chain for oven applications, and further for applications where chains are exposed to extreme conditions, such as heat and increased speed. Roller chains are known to improve the smoothness of operation and to extend the life of chains. Increased bearing areas between pins and bushings for chain-life prolongation are explained in detail in U.S. Pat. No. 4,571,229. However, it has previously not been practical to use chains with larger bearing areas in combination with rollers, because conventional rollers would have changed dimensions to such an extent that they would not be usable with existing equipment.

It is an object of the present invention to overcome deficiencies of the prior art and to provide extended life for roller chains for use in decorating ovens.

SUMMARY OF THE INVENTION

In a preferred embodiment, the present invention is a roller chain having pins, bushings and rollers, pin link plates and bushing link plates. In one example, pitch conforms to specifications of ANSI Chain No. 60. Unlike the standard No. 60 chain, however, the present chain provides an enlarged pin outer diameter with a complimentary enlarged bushing inner diameter so as to provide approximately 20% more bushing to pin bearing area. The increased bearing area increases wear life by reducing unit pressure for the same applied force. While the No. 60 roller chain has a standard pin diameter of 0.234 inch, the present invention preferably has a pin diameter of about 0.280 inch or more.

Unlike previous U.S. Pat. No. 4,571,229, wherein the enlarged pin and bushing diameters increased wear time but did not allow for accommodation of a roll on the bushing because the increase was too extreme, the present increase in pin outer diameter to 0.280 inch and concurrent increase in bushing outer diameter is sufficient to prolong the chain life, while still allowing accommodation of a roll. A roll is necessary in pin oven applications, for which the present invention is designed. ANSI standards as used herein refer to the published Standards of the American National Standards Institute at the filing date hereof. The ANSI Standards Chain is referenced throughout.

The unique combination of increased pin and bushing diameters with a roller on otherwise standard ANSI chains substantially increases the life of a chain. Specifically, comparison tests run between a standard ANSI No. 60 chain versus the improved chain of the present invention showed elongation of approximately 0.12 inch/foot of standard No. 60 chain for approximately 60 hours of operation versus approximately 0.03 inch for the improved chain. Further, in over 150 operating hours, the improved chain of the present invention displayed 0.12 inch elongation after approximately 120 operating hours (twice as long as the standard No. 60 chain), and about 0.15 inch elongation after 150 operating hours. Thus, the present increased pin diameter roller chain provides for substantially increased periods of time between chain replacements, resulting in savings in replacement material and time expenditures.

Because a roll is necessary for decorating chain in oven applications, experimentation has shown that the specifications for the present invention afford the only practical design with the largest pin and bushing diameters to increase load bearing area, yet still accommodate a roll for smooth sprocket engagement on ANSI standard No. 60 sprockets and non-interference with system guide rails and wear strips.

It is the object of the present invention to provide a large bearing area roller chain for decorating oven application which has link plates and pitches of ANSI standard number chains for operation on ANSI standard sprockets of the same number, wherein the large bearing area is provided by non-standard enlarged pins and bushings having maximum diameters which can still accommodate a roll for operation on the standard sprocket.

The present roller chain apparatus is a chain having plural spaced pins, bushings and rolls in bushing links and pin links connected in spaced alternating relationships of bushing link, pin link, bushing link and pin link. Each bushing link has first and second spaced opposite bushing plates, wherein each plate incorporates first and second bushing-receiving openings. Each bushing link further incorporates first and second parallel cylindrical bushings extending into the first and second openings in the opposite bushing plates. The ends of the bushings are secured in the openings for holding each bushing link in the assembled condition. Each pin link incorporates first and second spaced opposite pin plates positioned outward of end portions of bushing plates on adjacent bushing links. Each pin plate has first and second pin-receiving openings. First and second pins extend respectively through first and second openings in first pin plates, through second and first bushings in adjacent bushing links, and through first and second openings in second pin plates. The pins fit within the bushings for free rotary bearing motion between the pins and the bushings. The ends of the pins are fixed in pin plates for rigidly connecting elements of the pin links and permitting the pin links and bushing links to rotate about each other on the pins and bushings.

Chain wear and resultant chain elongation occurs at the arcuate cylindrical portions of the pins and bushings which contact each other.

Each bushing is provided with a roller, which is a hollow cylindrical structure having an inner diameter slightly larger than the outer diameter of the bushing. The roller is placed on the bushing prior to securing ends of the bushing in the bushing plates. The inner diameter of the bushing has a diameter which is slightly larger than the outer diameter of the pin. A cross-section of the roller, bushing and pin shows a concentric configuration which describes clearance relationships.

The pin plates and bushing plates have rounded ends which facilitate relative rotation of the links. Preferably, outer diameters of rollers do not extend beyond the radii of the bushing plate ends. The pins preferably have outer radii greater than 40% of the corresponding radii of the rounded ends of both the bushing plates and pin plates. That enlarged pin diameter requires the inner radii of the concentric bushings to be enlarged, thus creating increased bearing area. The enlarged concentric bearing area in turn causes the outer diameters of the bushings and the inner diameters of the rollers to be enlarged, yet still provides clearance between the outer radii of the bushing plate ends and the outer radii of the roller. The clearances of the roller, and the reduced thicknesses of the roller and bushings are such that longevity as provided by the increased pin and usefulness in application are not detracted from.

In a preferred embodiment, the thickness of the bushings and rollers are reduced from standard thicknesses. The clearance between the radii of the bushing plate and roller are constrained by practical designs consistent with pin oven applications. Smooth sprocket, system guide rail and wear strip engagements are not interfered with through the reduced thicknesses.

These and further and other objects and features of the invention are apparent in the disclosure, which includes the above and ongoing written specification, with the claims and the drawings.

BRIEF DESCRIPTION OF THE DRAWINGS

FIGS. 7a and 7b are end and cross-sectional views of a seamless roller of the present invention.

FIGS. 8a and 8b are plan and end views of a roll construction of sheet metal.

FIG. 9 is an end view of the roller link and roll of the present invention.

FIG. 12a, 12b and 12c show top, side and end views of a roller chain with high temperature clearance and an extension pin engagement.

DETAILED DESCRIPTION OF THE DRAWINGS

Figure 1:
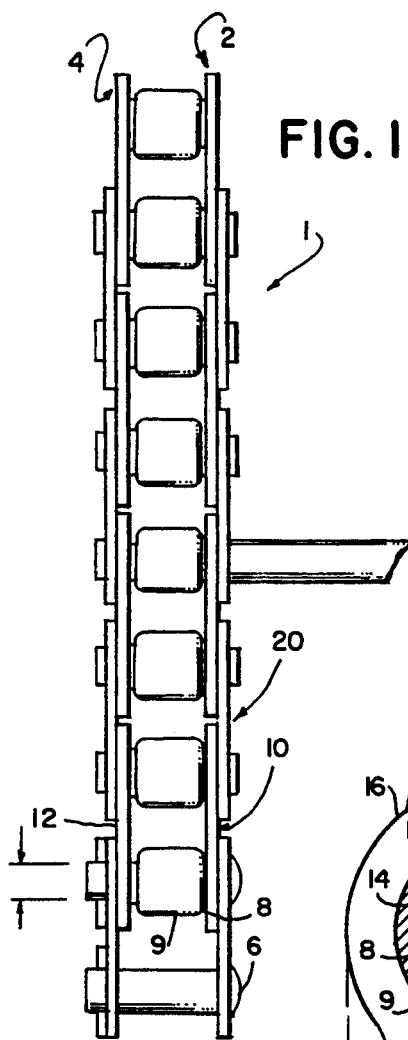
FIG. 1 is a plan view of the preferred roller chain apparatus.
Figure 2:
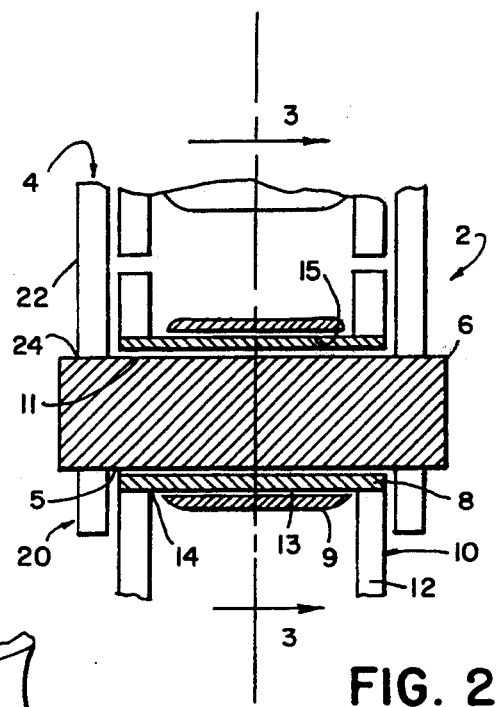
FIG. 2 is a cutaway top view of the enlarged pin with concentric bushing and roller.
Figure 3:
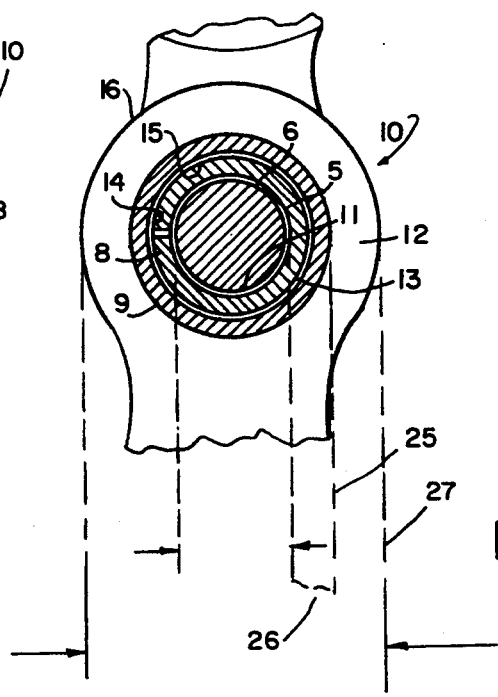
FIG. 3 is a sectional view along line 3—3 in FIG. 2.

Referring to FIGS. 1 and 2, the preferred roller chain of the present invention is generally indicated by the numeral 1. The chain has a plurality of links 2, each having parallel link plates 4 joined by pins 6 or bushings 8. The links 2 comprise alternating bushing links 10 and pin links 20. Bushing links 10 have first and second parallel bushing link plates 12, each with first and second bushing-receiving openings 14, and rounded ends 16, as shown in FIG. 3. The bushing-receiving apertures 14 are centrally positioned within each rounded bushing plate end. Bushings are secured in the openings perpendicularly between paired bushing link plates. Ends of the bushings are fixed in the openings by press fits.

Pin links 20 have parallel pin plates 22 with openings 24 at opposite ends thereof for receiving pins 6. Ends of the pins 6 are fixed in the respective openings 24 of the pin plates by upsetting the pin ends in the pin plate openings after the pins are inserted through respective bushings 8 in spaced bushing links 10. Bushings links 10 and pin links 20 rotate freely around concentric axes of the pins and bushings by virtue of loose rotary bearing contact of pins 6 and bushings 8. A roller 9 is placed over each bushing prior to fixing the bushing ends in the bushing link plates. The pin, bushing and roller combination form concentric cross-sections, as shown in FIG. 3. The surfaces between the pin 6 and the bearing 8, and further between the bearing 8 and the roller 9, freely slide and rotate with respect to one another. Outer surfaces of the rollers contact sprocket teeth and guides as the chains are driven along predetermined paths.

Objects of the invention are to increase chain longevity and to provide a larger bearing area between the pin and bushing than provided on standard ANSI chains, while still providing rollers on the bushings. The radii 25 of the rollers 9 in FIG. 3 must still provide sufficient clearance 26 with respect to the radii 27 of the rounded bushing plate end 16. Increased bearing area between an inner surface 11 of the bushings 8 and the outer surfaces 5 of the pins 6, permitted by increases between an inner surface 15 of roller 9 and outer surface 13 of bushing 8, reduces unwanted elongation of the chain over extended operating periods. Further, the high bearing areas of the outer surfaces 13 of the bushings 8 distribute the force over the bushing-receiving holes 14 and, thus, over the rounded end portions 16 of the bushing link plates 12. That reduces fatigue, creep and elongation or failure of the bushing link plates 12.

In the preferred embodiment of the chain shown in the drawings, the pitch, which is the distance between the center lines of the pins is ¾ inch. The rounded bushing link plate end 16 is about 0.7 inch in diameter and has a thickness of approximately 0.094 inch. Alternatively, non-standard bushing link plates of increased thickness could be used, or both bushing link plates and pin link plates may be of heavier thickness. The inner width of the chain, which is the distance between the insides of the bushing link plates, is approximately ½ inch, somewhat larger than the length of the roll which is approximately 0.487 inch. The bushing has an outer diameter of approximately 0.375 inch and an inner diameter of approximately 0.285 inch. Since the diameter of the pin is 0.281 inch, that provides approximately 0.004 inch clearance between the outer surface of the pin and the inner diameter of the bushing. The inner diameter of the roll is between 0.381 inch and 0.385 inch, thus providing between 0.006 inch and 0.010 inch clearance between the outer surface of the bushing and the inner surface of the roll. The clearances provide areas for adequate lubrication and free rotation. Lubrication is provided between the roll ends and bushing plate and flows inward through a central opening in each bushing for lubricating the pin-bushing interface.

The embodiment invention with the aforementioned dimensions would be used in place of an ANSI standard No. 60 chain. The standard chains have pin diameters of 0.234 inch, roller outer diameters of 0.468 inch and bushing plate diameters of 0.71 inch. The present invention restricts the outer diameter of the roller to previous standard application sizes but increases the pin diameter from approximately 0.234 to 0.281 inch, forsaking bushing and roller thicknesses for increased pin diameter. In effect, this increases sizes of wear areas between the bushing and pin, and further between the bushing and roller. Tests have shown that decreasing thicknesses of the roller and bushing do not decrease the life of the chain. On the contrary, the increased pin size with combined bushing and roller thinning greatly increases the life of the chain through increased resistance to elongation. On the other hand, care must be taken not to decrease the bushing and roller thicknesses to a point where they would fail so quickly as to offset any advantages from increased pin size. Thus, increases in the diameter of the pin are constrained in applications requiring standard functions, as with the ANSI No. 60 chain, which requires a certain roller outer diameter for sprocket engagement.

The varying pitches and widths may be used with varying pin diameters in keeping with the proportions of the aforesaid description while attaining the advantages of the present invention. Further, it is not beyond the scope of the invention to expand the principle of increasing pin size to non-standard dimensions for other ANSI standard number chains.

The present invention enables high speed of operations of a chain without the attendant elongation, which requires costly shutting down of a line for a replacement of standard chains. Further, increasing of the bearing areas with retention of the rollers keep chain noise to a minimum and reduces sprocket wear, which may result from the elimination of rollers.

Figure 4:
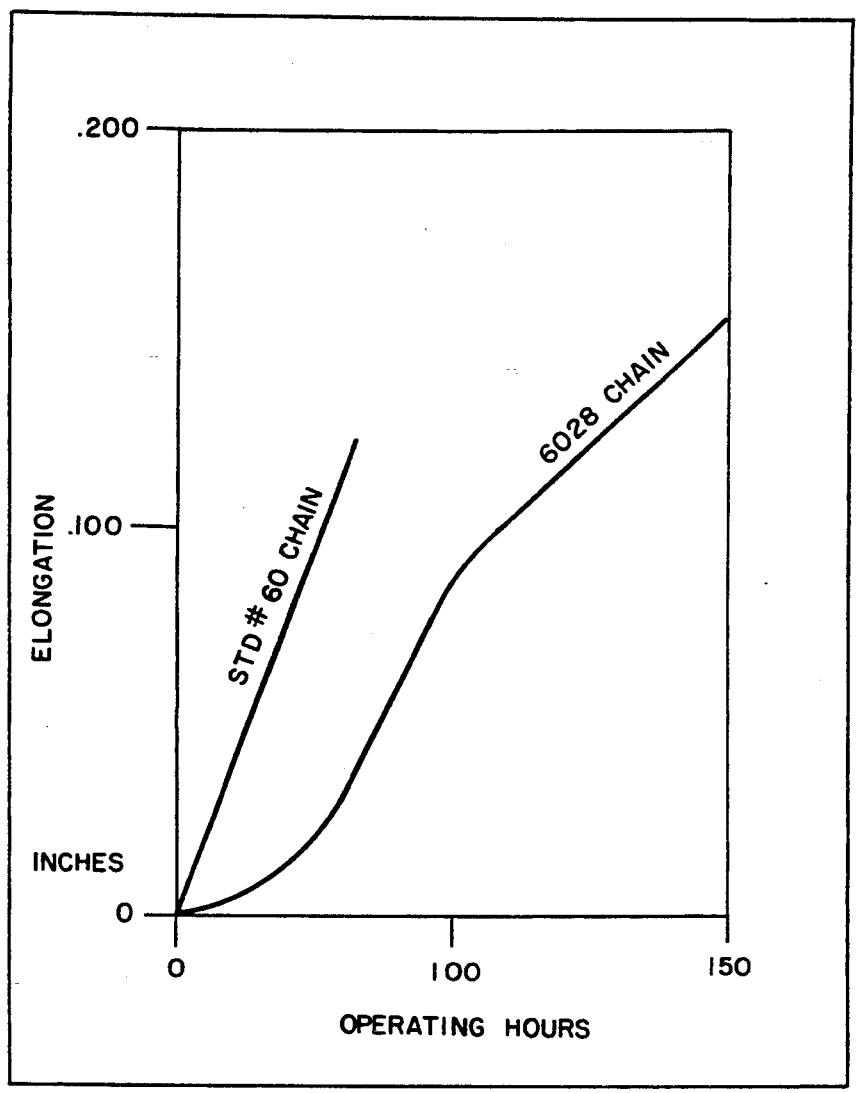
FIG. 4 is a graph comparing use to elongation of a standard ANSI roller chain and the enlarged pin roller chain of the present invention.

FIG. 4 compares a standard No. 60 ANSI chain with the large bearing area roller chain of the present invention. Both are standard ¾ inch pitch chains having outer roller diameters of approximately 0.468 inch. As shown, the standard No. 60 chain elongates approximately 0.120 inch after approximately 60 operating hours. The chain of the present invention does not show similar elongation until almost double as many hours at approximately 120 hours. These measurements are in inches per foot.

Figure 5:
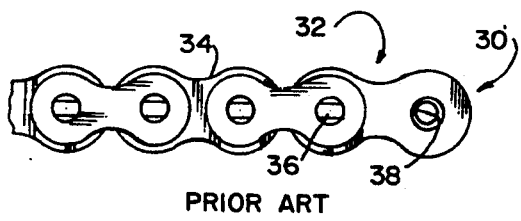
FIG. 5 is a side elevation of a standard roller chain.
Figure 6:
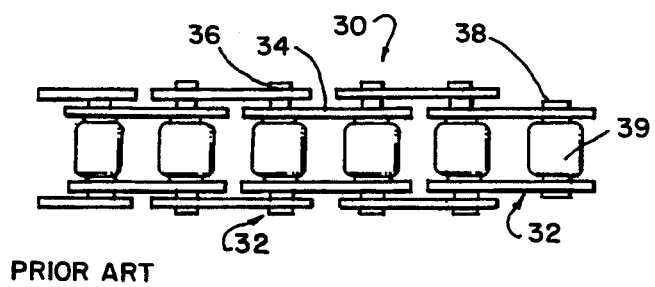
FIG. 6 is a plan view of a standard roller chain.

FIGS. 5 and 6 show the standard No. 60 roller chain of ¾ inch pitch, which the chain of the present invention replaces. The standard prior art chain 30 has standard links 32 and standard link plates 34, with standard pins 36 and standard bushings 38 and rollers 39 mounted externally on the bushings 38 between opposite bushing link plates.

As shown in FIGS. 5 and 6, the standard bushings and standard pins have relatively small bearing areas, and the bushings have relatively small mounting areas within the rounded ends of the bushing link plates. Small bearing areas between the concentric pins and bushings, and further between the bushings and bushing link plates, account for chain elongation and necessitate chain replacement. The present invention, as well as increasing concentric bearing areas, also increases bearing areas between the bushing ends and bushing link plates because of the increased pin and bushing sizes.

The roll of the present invention can be a seamless tubular formed cylinder having beveled edges, as shown in FIGS. 7a and 7b, or alternatively, a roll constructed of rolled sheet metal, as in FIGS. 8a and 8b. In one examples, a maximum outer diameter of either roll is 0.469.

FIG. 9 shows an end view of the bushing link 10 and roll 9. The dashed lines represent pin 6 and bushing 8.

Figure 11A:
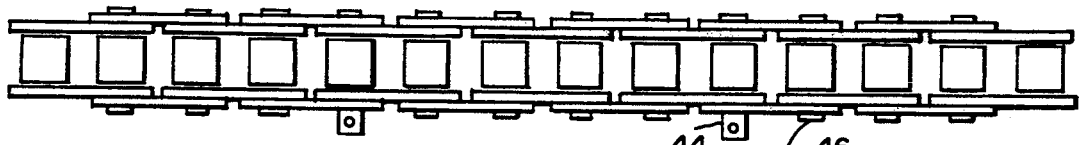
FIGS. 11a and 11b show corresponding top and side views of a preferred embodiment of the chain, wherein alternative pin extension attachment means are provided.
Figure 11B:
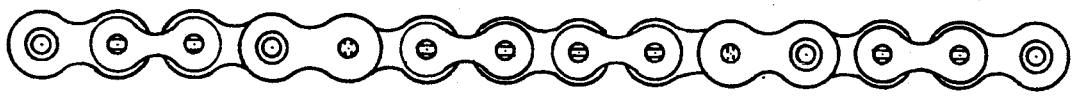
Figure 10A:
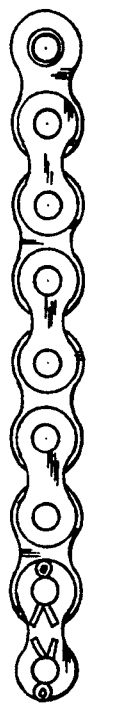
FIGS. 10a and 10b show a side elevation and a plan view of a preferred large bearing area roller chains, with an attached extension pin for pin oven applications.
Figure 10B:
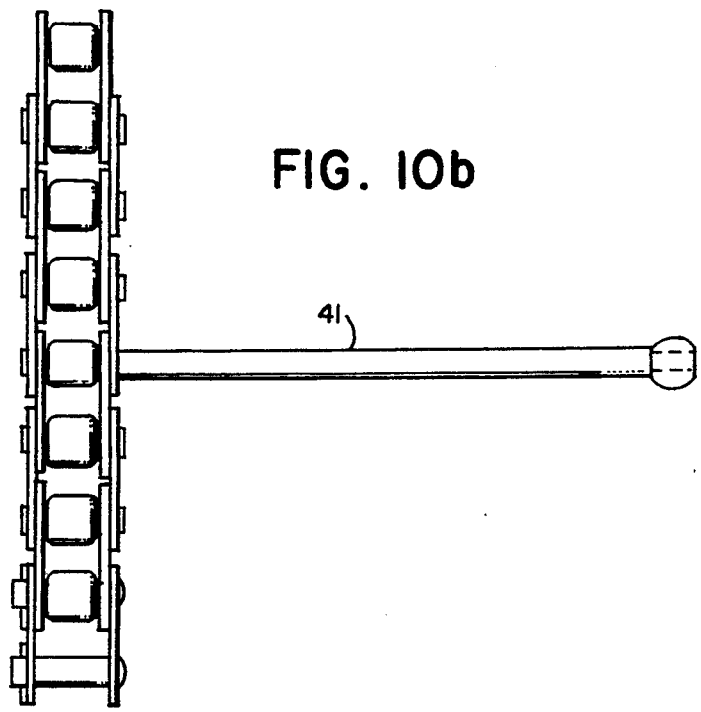

FIGS. 10a and 10b disclose side and front views of a preferred embodiment of the invention with a pitch of 0.750 inch. Pin extension 41 is shown in full length and is integrally attached to one of the pin plates. Alternatively, FIGS. 11a and 11b show front and side views of a length of chain with pitch specifications and an alternate pin extension attachment 43. The attachment 43 in this embodiment incorporates coupled pins which extend beyond the pin plate and allow for mating with a pin extension plate (not shown).

FIGS. 11a and 11b also show another preferred chain of the present invention, wherein the pin extension attachment means incorporates an extended pin 44 coupled with flare rivets 46, both for mating with a pin extension plate.

FIG. 12c shows a end view of a single link with an extended pin, wherein the extended pin 44 incorporates a bore hole 45 for receiving a cotter pin (not shown) for holding the pin extension plate securely onto the extended pin.

The present invention increases the pin diameter to plate end ratios from the standard 0.34 to 0.41, for ANSI No. 60 chains. ANSI No. 25 and No. 35 chains have ratios which are 0.39 or less than two fifths. Those two have the highest standard ratios. The present invention is novel in its use of non-standard, enlarged pin diameters with standard roller chambers.

The present invention provides a chain with increased operating time, reducing chain replacement requirements measured by chain elongation. The increased chain life greatly improves continuous 24 hour line production by extending intervals between shut downs for chain replacement. The increased chain life and reduced elongation is achieved by providing high bearing areas by using increased pin and bushing diameters and increased diameters of bushing-receiving openings. The thinning of rollers and bushings and the increasing of diameters in the loaded interfaces reduces unit loading from the normal force, spreading the force and reducing wear. The thinning of the rollers and bushings and increasing radii of curvature of the faces may also enhance lubrication flow to and along the faces. Rollers further reduce wear of the bearing areas, reduce noise and increase life of sprockets. The pin radii is approximately 0.4 or greater of the radii of the bushing link plate end, and the bushing and roller width are subsequently lessened to restrain the width of the roller to application suitable for the standard sized chains.

The chain is preferably used in oven applications, wherein carrier plates can be included at intervals along the chain. The carrier plates incorporate an extending carrier which holds or grips items to be passed through an oven. One preferred use is drying printed cans in an oven, wherein the chains are exposed to high temperatures and fast movement. Lighter loads are typical in such environments, but specific alloys could be provided within the bushings and rollers to increase strength despite their thin widths, thus allowing heavier loads to be carried while still retaining the advantages of the present invention.

While the invention has been described with reference to specific embodiments, modifications and variations of the invention may be constructed without departing from the scope of the invention, which is defined in the following claims.

I claim:

1. A large bearing area roller chain apparatus comprising a chain having plural spaced bushing links and plural spaced pin links, respectively connected in alternating relationships of bushing link, pin link, bushing link and pin link; each bushing link having first and second spaced opposite bushing plates, each bushing plate having first and second bushing-receiving openings, each bushing link further incorporating first and second parallel tubular cylindrical bushings extending into the first and second openings in the opposite bushing plates, wherein ends of the bushings are secured in the bushing-receiving openings for holding each bushing link in the assembled condition; each pin link incorporating first and second spaced opposite pin plates positioned outward of end portions of bushing plates on spaced bushing links, wherein each pin plate has first and second pin-receiving openings and first and second parallel pins extending respectively through first and second openings in one pin plate, through second and first bushings respectively in spaced bushing links and through first and second openings in the first and second pin plate, the pins fitting within the bushings for free rotary bearing motion between the pins and the bushings; the ends of the pins being fixed in pin plates for rigidly connecting elements of the pin links and permitting the pin links and bushing links to rotate about each other on the pins and bushings; each bushing provided with a roller which is a hollow tubular cylindrical structure having an inner diameter slightly larger than the outer diameter of the bushing, wherein each roller is placed on a bushing prior to securing of the bushing to the second bushing plate, the inner diameter of the bushing having a diameter slightly larger than the outer diameter of the pin; the rollers and bushings having thin cross-sectional annular thicknesses profiles less than standard rollers and standard bushings and the pins and bushings having respective external and internal diameters greater than that of pins and bushings of ANSI standard roller chains, the said diameters of the pins and bushings accommodating increased bearing areas therebetween, thereby slowing wear and elongation; the cylindrical rollers having outer and inner diameters adapted to accommodate enlarged diameter bushings while allowing usage of the roller chain on standard sprockets.

2. The apparatus of claim 1, further comprising accommodating pin and bushing plates with pitches between the chain links, and the outer diameters of the rollers, being of given ANSI standard measurements for a standard ANSI chain.

3. The roller chain of claim 1, further comprising pin and bushing link plates of ANSI standard No. 60 chain, wherein the pitch P is 0.750 inch, the nominal width W is 0.500 inch, and the maximum outer diameter of the rollers Dr is approximately 0.469 inch, and the non-standard enlarged pin has a diameter Dp of about 0.281 inch.

4. A roller chain for pin oven application, having bearing areas comprising pin and bushing link plates with pitches of ANSI standard roller chains for operation on ANSI standard roller chain sprockets, enlarged diameter non-standard pins and enlarged diameter non-standard bushings, and bushings and rollers having thin cross-sectional profiles less annular thicknesses than standard ANSI roller chains.

5. The roller chain of claim 4, further comprising the non-standard pin diameter of 0.281 inch.

6. A roller chain comprising link plates, pitch, roller width with outer diameter of overall ANSI standard size for operation on standard size sprocket and guides, wherein link plate openings, bushings and connection pins have enlarged non-standard internal and/or external diameters greater than respective diameters of openings in ends of the standard link plates, bushings and pins.

7. The roller chain of claim 6, having enlarged bearing areas, further comprising ANSI standard No. 60 chains, link plates of 0.68 inch thickness and pitches of 0.75 inch for operation on an ANSI standard No. 60 sprocket, wherein the diameter of the pin is enlarged to a non-standard width of 0.281 inch.

8. A method of prolonging life of a standard ANSI roller chain, comprising making cross-sectional profiles of roller and bushing less than the cross-sectional profiles of standard chains and increasing pin and bushing diameters relative to standard ANSI chain with standard plates and pitches to above standard dimensions of pin and bushing diameters, wherein the resultant non-standard chain can still be used on a sprocket of the same ANSI number as the standard chain while prolonging chain longevity.

9. The method of claim 8, further comprising increasing diameters of pin and bushing receiving openings in respective rounded ends of pin and bushing plates.

10. The method of claim 8, further comprising providing a standard ANSI No. 60 chain, having plate end diameters of 0.68 and pitches of 0.75 inch, with a non-standard pin diameter of 0.281 inch.

11. A large bearing area roller chain apparatus comprising a chain having plural spaced bushing links and plural spaced pin links, respectively connected in alternating relationships of bushing link, pin link, bushing link and pin link; each bushing link having first and second spaced opposite bushing plates, each bushing plate having first and second bushing-receiving openings, each bushing link further incorporating first and second parallel tubular cylindrical bushings extending into the first and second openings in the opposite bushing plates, wherein ends of the bushings are secured in the bushing-receiving openings for holding each bushing link in the assembled condition; each pin link incorporating first and second spaced opposite pin plates positioned outward of end portions of bushing plates on spaced bushing links, wherein each pin plate has first and second pin-receiving openings and first and second parallel pins extending respectively through first and second openings in one pin plate, through second and first bushings respectively in spaced bushing links and through first and second openings in the first and second pin plate, the pins fitting within the bushings for free rotary bearing motion between the pins and the bushings; the ends of the pins being fixed in pin plates for rigidly connecting elements of the pin links and permitting the pin links and bushing links to rotate about each other on the pins and bushings; each bushing provided with a roller which is a hollow tubular cylindrical structure having an inner diameter slightly larger than the outer diameter of the bushing, wherein each roller is placed on a bushing prior to securing of the bushing to the second bushing plate, the inner diameter of the bushing having a diameter slightly larger than the outer diameter of the pin; the rollers and bushings having a width less than that of the pins and bushings having diameters more than that of the pins, bushings and rollers of standard roller chains, the diameter of the pins and bushings being providing for increased bearing areas, thereby slowing wear and elongation; the cylindrical rollers having outer and inner diameters so formed as to accommodate the bushing while allowing usage of the roller chain on standard sprockets.

12. The apparatus of claim 11, further comprising the plates and pitches between the chain links and the outer diameters of the rollers being of given standard measurements for a standard chain, the pins and bushings being larger than non-standard for a standard chain.

13. The roller chain of claim 11, further comprising the link plates and connections being of a standard No. 60 chain, wherein the pitch is 0.750 inch, the inside width is about 0.500 inch, and the outer diameter of the rollers is approximately 0.468 inch, and the non-standard enlarged pin has a diameter of about 0.281 inch.

14. A roller chain for pin oven application, having enlarged bearing areas comprising link plates and pitches of standard roller chains for operation on a standard roller chain sprockets, non-standard pins having a diameter larger than standard pins and non-standard bushings having a diameter larger than standard bushings, and bushings and rollers having profiles less than that of standard roller chains.

15. The roller chain of claim 14, further comprising the non-standard pin diameter of 0.281 inch.

16. A roller chain comprising link plates, pitch, width and roller outer diameters of overall standard sizes for operation on standard size sprocket and guides, wherein link plate openings, bushings and connection pins have enlarged non-standard diameters greater respective diameters of openings in ends of the standard link plates, bushings and pins.

17. The roller chain of claim 16, having enlarged bearing areas, further comprising standard No. 60 chains, link plates of 0.68 inch thickness and pitches of 0.75 inch for operation on a standard No. 60 sprocket, wherein the diameter of the pin is enlarged to a non-standard width of 0.281 inch.

18. A method of prolonging life of a standard roller chain, comprising making roller and bushing profiles less than that of standard rollers and bushings and making pin and bushing diameters greater than that of standard chains with standard plates and pitches to above standard dimensions of pin and bushing diameters, wherein the resultant non-standard chain can still be used on a sprocket of the same number as the standard chain while prolonging chain longevity.

19. The method of claim 18, further comprising increasing diameters of pin and bushing receiving openings in respective rounded ends of pin and bushing plates.

20. The method of claim 18, further comprising providing the standard No. 60 chain, having plate end diameters of 0.68 and pitches of 0.75 inch, with a non-standard pin diameter of 0.281 inch.

* * * * *